G. WOLF.
INSTRUMENT FOR EXAMINING CAVITIES OF THE BODY.
APPLICATION FILED JAN. 24, 1922.
1,431,902.  Patented Oct. 10, 1922.
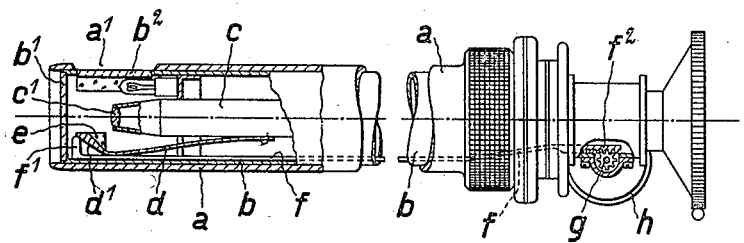

Patented Oct. 10, 1922.

1,431,902

UNITED STATES PATENT OFFICE.

GEORG WOLF, OF BERLIN, GERMANY, ASSIGNOR TO THE FIRM OF GEORG WOLF, G. M. B. H., OF BERLIN, GERMANY.

INSTRUMENT FOR EXAMINING CAVITIES OF THE BODY.

Application filed January 24, 1922. Serial No. 531,500.

*To all whom it may concern:*

Be it known that I, GEORG WOLF, a citizen of the German Empire, and residing at Berlin, Germany, have invented a new and useful Instrument for Examining Cavities of the Body (for which I have filed an application in Germany Jan. 19, 1921), of which the following is a specification.

The present invention relates to instruments for medical purposes for examining cavities of the body, e. g., cystoscopes, rectoscopes and the like. As a rule, these instruments are of such construction that within a tube forming the outer casing there is another, detachable tube which forms the carrier for the optical parts serving for the observation. According to the particular purpose pursued with this instrument in the particular case, the said optical tube is designed for straight inspection or for lateral look-out, in the latter case it therefore possesses in the vicinity of the objective a rigidly disposed reflector, mostly a reflector prism by which the optical axis is laterally deflected by about 90°. However, for numerous examinations it is desirable to be able to alternately observe both straight ahead and laterally. Hitherto it was necessary to always remove in such cases the optical tube used at any time and to replace it by a corresponding tube having another direction of look-out. This necessitates, on the one hand, a troublesome interruption of the examination during the interchange and thus a considerable loss of time, on the other hand, almost the complete optical outfit is required twice. According to the invention this drawback can be obviated in such instruments in which the objective with its optical axis is parallel to the axis of the outer tube, by fitting in front of the objective a movable reflector which is so connected to an adjusting device to be actuated from the ocular end that it can be inserted in front of the objective within the tube of the instrument, according to requirement, in order to attain a lateral look-out, or be laterally displaced in order to afford a straight inspection. In this arrangement only one short manipulation is required in order to displace the reflector forward or back so that the direction of look-out can be quickly and easily changed as often as desired during an examination. In that case it is of importance that contrary to the well-known retrograde cystoscope after Schlagintweit the reflector disposed in front does not project beyond the tube of the instrument in any of the two positions so that, as hitherto, all optical parts can be disposed apart within an optical tube tightly shut off outside.

The transmission of the motion from the ocular end to the displaceable reflector can be realized in any desired way. As a rule, there will be used for this purpose a rod or the like which is guided within the instrument parallelly to the axis of the tube and by the longitudinal displacement of which the reflector is moved. The reflector itself is in that case capable of being turned aside or also of being displaced. In most cases a totally reflecting reflector prism will be used in the usual manner as a reflector.

In the annexed drawing the invention is illustrated in a rectoscope. The figure shows a side elevation of the instrument with its substantial parts in section.

Into a tube $a$, forming the outer casing and having besides the opening at the front a lateral opening $a^1$, there is inserted from the ocular side a second tube $b$ containing the optical parts. The front-opening of the latter tube as well as a second opening behind the window $a^1$ are tightly closed by a glass disc each $b^1$ and $b^2$ respectively. Within the tube $b$ there is fixed a tube $c$ having a smaller diameter, within which, behind an objective $c^1$, the other lens systems required for producing the image are assumed to be fitted. Outside the tube $c$ there is fastened a holder $d$ designed as a laminated spring; this holder carries at its front free end a reflector prism $e$ and, owing to the spring action, rests upon a stop $f^1$ with a slope fitted underneath. The stop $f^1$ is displaceable in the direction of the axis of the instrument and connected for this purpose to a rod $f$, passing in the longitudinal direction through the entire instrument and ending in the ocular part into a rack $f^2$. With the latter there meshes a small driving-wheel $g$ which can be rotated by a roughened disc $h$.

In the position of the separate parts shown in the drawing, the instrument is adjusted for the straight direction of inspection through the front window $b^1$. The stop $f^1$ is displaced forward and the reflector prism $e$ is beyond the range of the rays beside the objective $c^1$. If it be desired to observe in the lateral direction through the window $b^2$, it is necessary to withdraw the stop $f^1$ by rotating the disc $h$, whereby the reflector prism $e$ is pressed in front of the objective $c^1$ owing to the slope $d^1$ of the spring $d$. The change in the direction of look-out can thus be brought about at any moment by means of a short rotation of the disc $h$.

I claim:

In an instrument for examining cavities of the body, a tube comprising optical elements which are adapted to form an image of the object to be observed, another tube enclosing the first named tube and being provided with two windows, viz an axial and a lateral one, a reflector adapted to deflect the rays impinging on it at an angle of about 90 degrees and being movably disposed within the outer tube in front of the first named tube, an adjusting device adapted to be actuated from the ocular end of the instrument, and means for connecting the said reflector to the said adjusting device, the latter allowing of inserting the said reflector in the path of rays penetrating the lateral window and of removing it therefrom so as to allow the rays penetrating the axial window to reach the said optical elements.

GEORG WOLF.

Witnesses:
E. HOLZERMAN,
JOHN W. BULKLEY.